(12) United States Patent
Troude et al.

(10) Patent No.: US 12,292,370 B2
(45) Date of Patent: May 6, 2025

(54) SYSTEMATIC CHARACTERIZATION OF OBJECTS IN A BIOLOGICAL SAMPLE

(71) Applicant: VITADX INTERNATIONAL, Rennes (FR)

(72) Inventors: Thibaut Troude, Paris (FR); Florent Couzinie-Devy, Montrouge (FR); Riadh Fezzani, Montrouge (FR); Marin Scalbert, Paris (FR); Shuxian Li, Antony (FR)

(73) Assignee: VITADX INTERNATIONAL, Rennes (FR)

( * ) Notice: Subject to any disclaimer, the term of this patent is extended or adjusted under 35 U.S.C. 154(b) by 328 days.

(21) Appl. No.: 17/795,755

(22) PCT Filed: Jan. 29, 2021

(86) PCT No.: PCT/EP2021/052105
§ 371 (c)(1),
(2) Date: Jul. 27, 2022

(87) PCT Pub. No.: WO2021/152089
PCT Pub. Date: Aug. 5, 2021

(65) Prior Publication Data
US 2023/0066976 A1  Mar. 2, 2023

(30) Foreign Application Priority Data
Jan. 30, 2020 (EP) .................... 20305082

(51) Int. Cl.
*G01N 15/1433* (2024.01)
*G06T 7/00* (2017.01)
(Continued)

(52) U.S. Cl.
CPC ....... *G01N 15/1433* (2024.01); *G06T 7/0012* (2013.01); *G06V 10/457* (2022.01);
(Continued)

(58) Field of Classification Search
None
See application file for complete search history.

(56) References Cited

U.S. PATENT DOCUMENTS 9,535,001 B2    1/2017  Kuninori et al.
12,057,229 B1*  8/2024  Vaickus .................. G06F 18/41
(Continued)

FOREIGN PATENT DOCUMENTS

FR    2996036 A1      3/2014
JP    H11118793 A     4/1999
(Continued)

OTHER PUBLICATIONS

International Search Report mailed on Apr. 6, 2021, in corresponding to International Application No. PCT/EP2021/052105; 4 pages.
(Continued)

*Primary Examiner* — Vikkram Bali
(74) *Attorney, Agent, or Firm* — Maier & Maier, PLLC

(57) ABSTRACT

A method for classifying and counting objects recoverable from a urine sample processed onto a slide. The method includes the following steps: receiving at least one digitalized image of the whole slide; detecting connected components by segmentation of the image of the whole slide; classifying the detected connected components into countable connected components and uncountable connected components using a classifier; for the countable connected components using an object detection model to obtaining the number of objects for each class; for the uncountable components using a semantic segmentation model to obtaining the number of objects for each class; summing up the number of objects for each class obtained from the semantic segmentation model and the object detection model outputting a number of objects for each class.

18 Claims, 2 Drawing Sheets

(51) Int. Cl.
*G06V 10/44* (2022.01)
*G06V 20/69* (2022.01)
*G01N 15/10* (2006.01)
*G01N 15/14* (2006.01)

(52) U.S. Cl.
CPC ... *G06V 20/698* (2022.01); *G01N 2015/1006* (2013.01); *G01N 2015/1486* (2013.01); *G06T 2207/10056* (2013.01); *G06T 2207/20081* (2013.01)

(56) References Cited

U.S. PATENT DOCUMENTS

2018/0322327 A1  11/2018  Smith et al.
2021/0082570 A1* 3/2021  Zhalyalov ............. G16H 40/67

FOREIGN PATENT DOCUMENTS

| JP | 2013153714 A  | 8/2013  |
| WO | 2012174542 A2 | 12/2012 |
| WO | 2015102948 A1 | 7/2015  |
| WO | 2015168365 A1 | 11/2015 |

OTHER PUBLICATIONS

Written Opinion of the International Searching Authority mailed on Apr. 6, 2021, in corresponding to International Application No. PCT/EP2021/052105; 8 pages.

Anton Bohm et al.; "ISOODL: Instance segmentation of overlapping biological objects using deep learning"; 2018 IEEE 15th International Symposium on Biomedical Imaging (ISBI 2018); IEEE, Apr. 4, 2018; XP033348370; DOI:10.1109/ISBI.2018.8363792; pp. 1225-1229.

Katkar et al., "Prediction of Isolated Erythrocytes Formation from Compound Erythrocytes in Blood Cells Images", IEEE, ISSN: 978-1-5386-4008-1, 2017 International Conference on Computing, Communication, Control and Automation (ICCUBEA), Aug. 17-18, 2017, 7 pages.

* cited by examiner

SYSTEMATIC CHARACTERIZATION OF OBJECTS IN A BIOLOGICAL SAMPLE

FIELD OF INVENTION

The present invention pertains to the field of biological analysis, especially for the detection of urological pathologies. More especially, this invention relates to a method which provides accurate information on the characterization of at least one, preferably a plurality of, objects that can be found in a body fluid sample, especially a urine sample, of a subject.

This invention relates to a method and a system for the analysis of relevant objects in a body fluid sample, which is preferably a urine sample. The method and system of the invention may be useful for detecting, discriminating and/or counting objects in at least one sample, said objects including for example cells or bacteria.

This invention also relates to the display of reliable information resulting from a systematic investigation and characterization of objects in a biological sample, especially a urine sample.

BACKGROUND OF INVENTION

Sample analysis is one of the most common tests for providing an overview of a subject's health status. The appearance of certain characteristic objects in a sample may be clinically significant and/or be indicative of pathological conditions in a subject.

Urine sample may contain a variety of objects, such as cell clusters, clumps or sheets; blood cells, for example erythrocytes or red blood cells (RBCs); urothelial cells, especially atypical urothelial cells; crystals; lymphocytes, leukocytes or white blood cells (WBCs); neutrophils, monocytes, eosinophils; or microorganisms, for example bacteria.

A common way of carrying out urinary sediment analysis is to deposit the urine cells present in the sample onto a microscope slide, and then to digitalize the slide, using a brightfield optical technology. However, despite the care taken in depositing the cells onto the slide, irregular layers of cells, clusters and other cell stacks may appear on the slide.

This issue was already raised in the prior art.

As an example of a cell analysis in a sample of the prior art, FR2996036 reports a method for identifying cells in biological tissue, each cell including a cytoplasm delimited by a cell membrane, the method comprising the following steps: a) acquiring a raw digital image of a section of the biological tissue containing the cells to be identified, this raw image comprising a plurality of pixels of values of different intensities; b) automatically generating at least one threshold image; c) automatically searching, in the threshold image, surfaces formed of a plurality of contiguous pixels having the same predefined intensity value, each surface thus found constituting a cell candidate. According to the invention, the predefined intensity value is that of the first and second intensity values corresponding to the cytoplasm.

However, this method is not accurate in a sample having overlaps, stacks, piles and/or clusters of cells.

WO2015102948 aims at improving the accuracy of urine-formed element's classification by calculating a difference between the average pixel value in the peripheral region and the average pixel value in the central region, after removing the effects of ambient light and defocusing noise.

However, this technique does not help in dealing with cell clusters.

WO2015168365 describes a method for processing a block to be processed of a urine sediment image, comprising the following steps:
- approximating the color of a pixel in a block to be processed to one of the kc colors in a code book (wherein the code book is a set of the kc colors generated in a set of urine sample blocks);
- obtaining a distribution histogram of the number of pixels the color approximation results which fall on each color of the kc colors;
- using an occurrence frequency correction factor to correct the number of pixels the color approximation results of which fall on each color in the distribution histogram;
- standardizing the corrected number of pixels, the color approximation results of which fall on each color in the distribution histogram; and taking the standardized distribution histogram as a feature in a feature set of block processing, processing the block to be processed.

This technique is particularly useful when the blocks are well defined, but may not give accurate results when the image is blurry or not fully focused on the block at stake.

Furthermore, this method needs the steps of data enhancement and pre-processing, comprising at least one of: rotation, scaling, translation, cropping, mirroring, elastic deformation.

Consequently, there is a need to find cost-effective, simple, reliable and reproducible methods and systems able to deal with heavy images, acquired by brightfield imaging, in order to propose a method of urine sample screening that would be suitable to screen large populations, especially populations at risk of developing urological pathologies linked to age, smoking habits or industrial exposure.

This is the reason why the present invention relates to a method that fulfills the unmet needs recited above, by using cost effective, reproducible and accurate means to compute digitalized images in order to identify and count the objects of a urine sample, and instantly display said count. The invention also includes a process to quickly operate a large number of samples one after the other.

SUMMARY

This invention relates to a method for classifying and counting objects recoverable from a urine sample processed onto a slide, wherein the method comprises on the following steps:
- receiving at least one digitalized image of the whole slide;
- detecting connected components by segmentation of the image of the whole slide;
- classifying the detected connected components into countable connected components and uncountable connected components using a classifier;
- for the countable connected components:
  - inputting each countable connected component into an object detection model so as to detect objects and obtain an output comprising a bounding box and an associated class for each detected object;
  - counting the bounding boxes associated to each class obtaining the number of objects for each class;
- for the uncountable components:
  - inputting each uncountable connected component into a semantic segmentation model and obtaining as output a segmentation mask in which all pixels are classified into one class among the predefined available classes;
  - for each object class, counting the number of objects as the ratio between a total pixel's area of the class, obtained as the number of pixels of the segmentation mask associate to said class, and an average area of the object of said class;

wherein said classes for the semantic segmentation model and the object detection model are the same, summing up the number of objects for each class obtained from the semantic segmentation model and the object detection model;

outputting a number of objects for each class.

Advantageously, the method of the present invention allows an accurate counting of the objects, even when the boundaries of the objects are hard to detect, due to unfocused images or the thickness of the objects on the slide, indeed, when single objects or overlapped objects have a significant thickness, some parts of the objects can be out of focus causing the images to be blurry/noisy. This method drastically reduces inaccuracy due to inaccurate segmentation.

In one embodiment, the semantic segmentation model is a U-Net.

According to one embodiment, the object detection neural network is a Faster-RCNN, CenterNet, SOLO or a YOLO.

According to one embodiment, the received digitalized image results from brightfield optical system.

According to one embodiment, the models are trained using a dataset of labelled digitalized images.

In one embodiment, the semantic segmentation model and the object detection model are trained using a dataset of digitalized images labelled by a clinician.

In one embodiment, the semantic segmentation model and the object detection model are trained using a stochastic gradient descent training method. The stochastic gradient descent optimization method advantageously allows to save computational time at every optimization step.

It consists in replacing the actual gradient (calculated from the entire training data set) by an estimate (calculated from a randomly selected subset of the data). This is very effective in the case of large-scale machine learning problems such the one in the present invention.

In one embodiment, each class is associated with at least one of the objects in the following list:
leukocytes: basophils, neutrophils, macrophage, monocyte and eosinophil;
red blood cells;
bacteria;
urinary crystal;
cylinder;
healthy and atypical urothelial cells;
squamous cells;
reactive urothelial cells,
yeast.

According to one embodiment, the method further comprises the step of displaying the total count of objects for each class alongside to the digitalized image of at least one portion of the whole slide.

According to one embodiment, the method further comprises the step of displaying at least one string of characters providing an information on the presence or absence of objects in a class in the digitalized image.

In one embodiment, the sample is colored by a Papanicolaou (or Pap) stain or any other multichromatic cytological stain known by a person skilled in the art.

The present invention also relates to a system for classifying and counting objects recoverable from a urine sample processed onto a slide, said system comprising:

at least one input adapted to receive at least one digitalized image of the whole slide comprising multiple objects;

at least one processor configured to:
detect connected components by segmentation of the image of the whole slide;
classify the detected connected components into countable connected components and uncountable connected components using a classifier;
for the countable connected components:
 i. input each countable connected component into an object detection model configured to detect objects and to output for each object one bounding box and an associated class;
 ii. count the bounding boxes associated to each class obtaining the number of objects for each class;
for the uncountable components:
 i. input each uncountable connected component into a semantic segmentation model and obtain as output a segmentation mask in which all pixels are classified into one class among the predefined available classes;
 ii. for each class, count the number of objects as the ratio between a total pixel's area of the class, obtained as the number of pixels of the segmentation mask associate to said class, and an average area of the object of said class;
summing up the number of objects for each class obtained from the semantic segmentation model and the object detection model;
wherein said classes for the semantic segmentation model and the object detection model are the same at least one output adapted to provide a number of objects for each class.

In an equivalent way, the system may comprising:

an acquisition module configured to receive at least one digitalized image of the whole slide comprising multiple objects;

a calculation module configured to:
detect connected components by segmentation of the image of the whole slide;
classify the detected connected components into countable connected components and uncountable connected components using a classifier;
for the countable connected components:
 input each countable connected component into an object detection model configured to detect objects and to output for each object one bounding box and an associated class;
 count the bounding boxes associated to each class obtaining the number of objects for each class;
for the uncountable components:
 input each uncountable connected component into a semantic segmentation model and obtain as output a segmentation mask in which all pixels are classified into one class among the predefined available classes;
 for each class, count the number of objects as the ratio between a total pixel's area of the class, obtained as the number of pixels of the segmentation mask associate to said class, and an average area of the object of said class;
wherein said classes for the semantic segmentation model and the object detection model are the same,
summing up the number of objects for each class obtained from the semantic segmentation model and the object detection model;

an output module configured to output a number of objects for each class.

This invention also relates to a computer program product for classifying and counting objects recoverable from a urine sample, the computer program product comprising instructions which, when the program is executed by a computer, cause the computer to carry out the steps of the method according to any one of the embodiments hereabove.

This invention also relates to a computer-readable storage medium comprising instructions which, when the program is executed by a computer, cause the computer to carry out the steps of the method according to any one of the embodiments hereabove.

In the present invention, the following terms have the following meanings:

"Atypical" for a cell means having at least one characteristic of the cell not reported in a non-pathological situation.

"Atypical urothelial cell" (AUC) is defined herewith with reference to the Paris System for Reporting Urinary Cytology (TPSRUC).

"Brightfield optical system" refers to imaging techniques where the images are produced by uniformly illuminating the entire sample so that the specimen appears as a dark image against a brightly lit background. Brightfield imaging is used as a general imaging technique for the observation and inspection of samples.

"Classifying" refers to categorizing the objects in the sample of the subject into different classes of interest such as for example red blood cells.

"Connected component" refers to one object or a group of objects wherein all pixels share similar pixel intensity values and are in some way connected with each other. An example of connected components is shown in FIG. 2.

"Counting" refers to enumerating the number of objects for each class of interest in the sample of the subject.

"Countable connected components" refers to a group of components, in the case of the present invention these components are called objects (i.e. leukocytes, cells, bacteria, etc.), that a trained doctor would identify as a group wherein, he/she can identify each single object and therefore he/she is able to count the number of objects comprised in the group. On the other hand, "uncountable connected components" refers to the opposite situation with respect to the countable connected components wherein a trained doctor would identify a group of objects but be unable to identify the single objects within the group. An example of countable and uncountable components is provided in FIG. 2. An objective scale for the connected components is typically defined by a panel of trained doctors, and this scale is similar to a standard and accepted by the person skilled in the art of cytological image analysis.

"Datasets" refers to collections of data used to build a machine learning (ML) mathematical model, so as to make data-driven predictions or decisions. In supervised learning (i.e. inferring functions from known input-output examples in the form of labelled training data), three types of ML datasets (also designated as ML sets) are typically dedicated to three respective kinds of tasks: training, i.e. fitting the parameters, validation, i.e. tuning ML hyperparameters (which are parameters used to control the learning process), and testing, i.e. checking independently of a training dataset exploited for building a mathematical model that the latter model provides satisfying results.

"Neural network or artificial neural network (ANN)" designates a category of ML comprising nodes (called neurons), and connections between neurons modeled by weights. For each neuron, an output is given in function of an input or a set of inputs by an activation function. Neurons are generally organized into multiple layers, so that neurons of one layer connect only to neurons of the immediately preceding and immediately following layers.

"YOLO" or "You Only Look Once" refers to a single convolutional network whose architecture is notably configured for object detection.

"SOLO" (Segmenting Objects by Locations) refers to a type of artificial neural network (ANN) that combines a self-organizing feature map (SOFM), principal component analysis and multivariate linear regression to produce a network architecture that is robust, stable and gives predictions of high quality.

"Faster R-CNN": refers to an object detection model that belongs to the family of two stages object detectors. The two stages in the Faster R-CNN corresponds respectively to two neural networks. The first one called the Region Proposal Network (RPN) outputs a set of bounding boxes candidates. the second one refines the bounding boxes coordinates and classify the bounding boxes into predefined classes.

The term "processor" should not be construed to be restricted to hardware capable of executing software, and refers in a general way to a processing device, which can for example include a computer, a microprocessor, an integrated circuit, or a programmable logic device (PLD). The processor may also encompass one or more Graphics Processing Units (GPU), whether exploited for computer graphics and image processing or other functions. Additionally, the instructions and/or data enabling to perform associated and/or resulting functionalities may be stored on any processor-readable medium such as, e.g., an integrated circuit, a hard disk, a CD (Compact Disc), an optical disc such as a DVD (Digital Versatile Disc), a RAM (Random-Access Memory) or a ROM (Read-Only Memory). Instructions may be notably stored in hardware, software, firmware or in any combination thereof.

"Semantic Segmentation": refers to an algorithm configured to classify individually each pixel of an image into predefined classes.

The terms "adapted" and "configured" are used in the present disclosure as broadly encompassing initial configuration, later adaptation or complementation of the present device, or any combination thereof alike, whether effected through material or software means (including firmware).

BRIEF DESCRIPTION OF THE DRAWINGS

The features and advantages of the invention will appear in the following description. Several modes of realization of the device and the method with respect to the invention will be explained.

DETAILED DESCRIPTION

Figure 1:
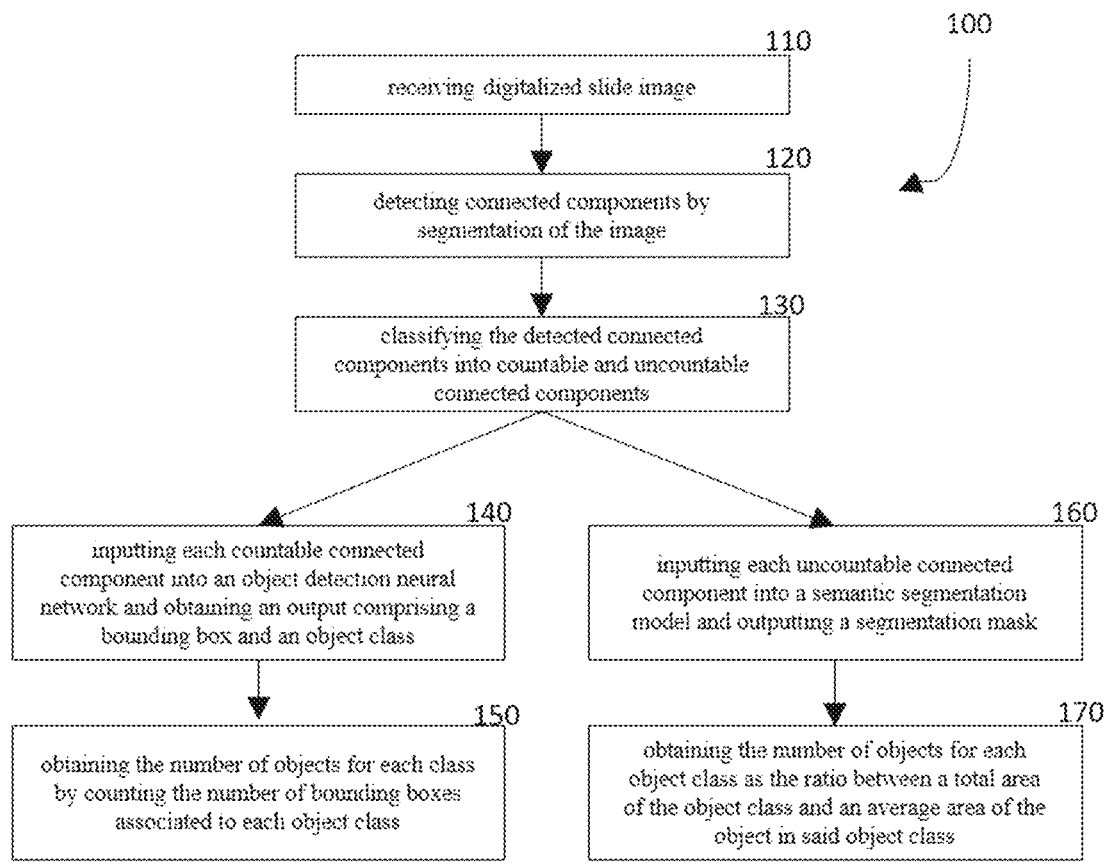
FIG. 1 is a block diagram representing the steps of the method of the present invention according to one embodiment.

The present invention relates to a cost-effective and high-throughput method to screen a biological sample, notably a urine sample processed into a slide. More precisely, the method of the present invention aims at discriminating and counting objects that are present in the biological sample of a subject.

A urine sample is obtained from a subject. The sample may also be another body fluid such as blood, plasma, serum, lymph, ascetic fluid, cystic fluid, urine, bile, nipple exudate, synovial fluid, bronchoalveolar lavage fluid, sputum, amniotic fluid, peritoneal fluid, cerebrospinal fluid, pleural fluid, pericardial fluid, semen, saliva, sweat, feces, stools, and alveolar macrophages. The sample may be concentrated or enriched.

In one embodiment, the method of the invention does not comprise obtaining a sample from a subject. In one embodiment, the sample of the subject is a sample previously obtained from the subject. Said sample may be stored in adequate conditions before being used according to the method of the invention.

The sample may be collected from a healthy subject or an unhealthy subject presenting tumorous cells or at risk of developing a urinary pathology. The method of the invention is designed to be applied to a large population of subjects.

In one embodiment, the sample is homogenized, deposited onto a filter and then brought into contact with the glass slide in order to deposit the cells therein. The material of the slide is preferably glass but can be in other materials such as polycarbonate for example. The material may be a single use material.

The slide deposit is stained according to the Papanicolaou staining protocol to detect the morphological alterations of the cells, these alterations being an indicator of cancer risk. Alternatively, different coloration means may be used together.

After the staining, the slide is covered. The slide may be covered by a cover glass or a plastic film for example.

According to one embodiment, the image of the slide of the urine sample is obtained from brightfield optical system, such as a whole slide scanner For the scanning step, the mounted slide may be digitized using any suitable brightfield optical system, such as for example a Hamamatsu Nanozoomer-S60 slide scanner. The data acquisition can also be realized with a Hamamatsu Nanozoomer-S360 slide scanner or the P250 or P1000 of 3DHistech.

The digitized image of the slide may be rectangular. The digitized image to be analyzed may be cropped, to define target areas wherein each target area is subjected to an analysis. Sensitive areas can be divided within the target area so as to enhance the accuracy of the analysis.

The embodiments disclosed herein include various operations that are described in this specification. The operations may be performed by hardware components and/or may be embodied in machine-executable instructions, which may be used to cause a general-purpose or special-purpose processor programmed with the instructions to perform the operations. Alternatively, the operations may be performed by a combination of hardware, software, and/or firmware.

The performance of one or more operations described herein may be distributed among one or more processors, not only residing within a single machine, but deployed across a number of machines. In some examples, the one or more processors or processor-implemented modules may be located in a single geographic location (e.g., within a home environment, an office environment, or a server farm). In other embodiments, the one or more processors or processor-implemented modules may be distributed across a number of geographic locations.

As shown in FIG. 1, according to one embodiment, the first step 110 of the method 100 consists in receiving at least one digitalized image of the whole slide or at least one portion of the whole slide.

In one embodiment, the method further comprises of step 120 connected components by segmentation of the image of the whole slide or the at least one portion of the whole slide. The segmentation method may be a threshold-based method allowing the separation of the foreground from the background. The connected components in the foreground may be retrieved from the segmentation mask. The connected component comprises of one object or a group of objects.

Figure 2:
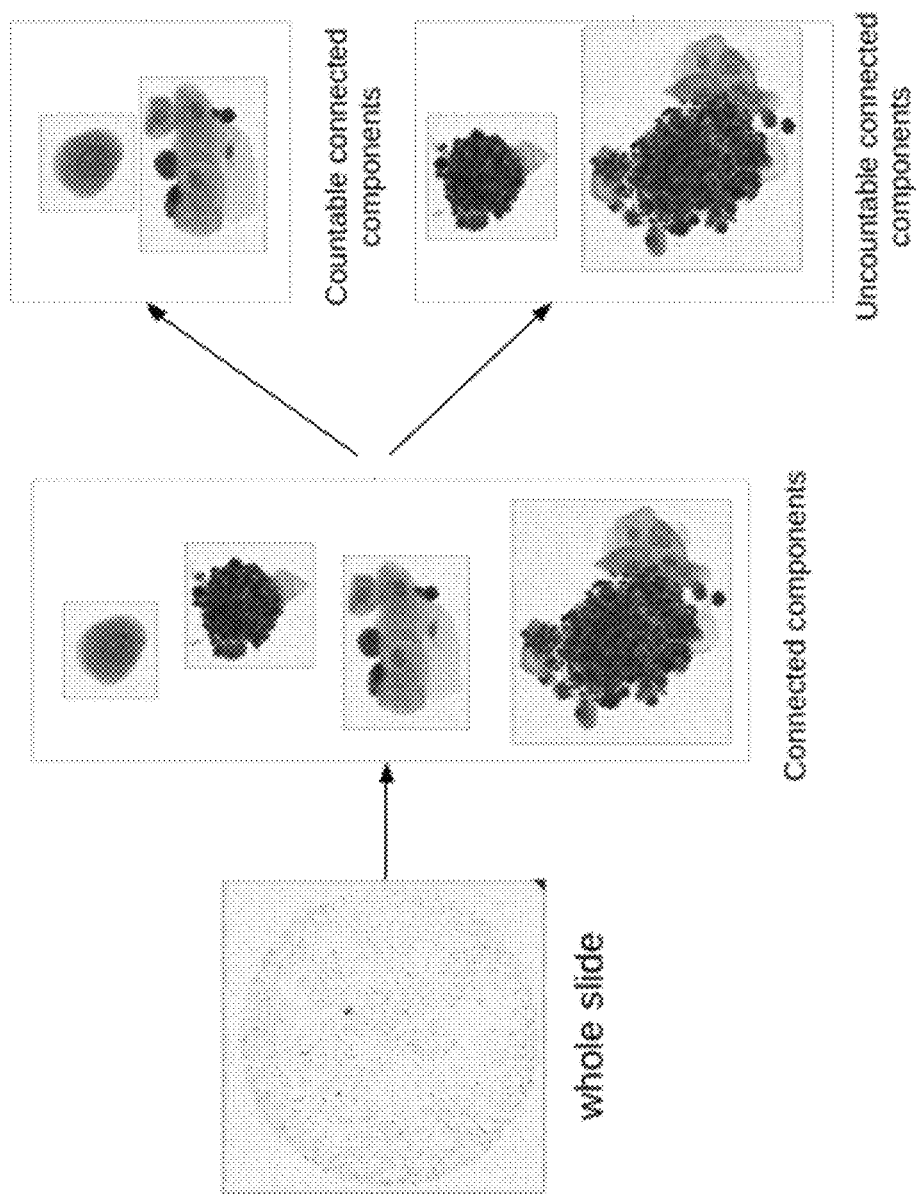
FIG. 2 provides an illustration of a digital whole slide image which comprises connected components, and an illustrative example of how the connected component are classified between countable connected components and uncountable connected components.

In one embodiment, the detected connected components are classified into countable connected components and uncountable connected components using a classifier (step 130), such as for example a convolutional neural network. The countable connected component is connected component for which a human is able to visually identify each object comprised in it. Inversely, the uncountable connected component are objects that cannot be visually identified by a human. An example of these countable and uncountable connected components is provided in FIG. 2.

According to one embodiment, the method of the present invention comprises for the countable connected components the step 140 of inputting each countable connected component into an object detection model. The object detection model is configured to detect objects comprised in the countable connected components and obtain as an output one bounding box and an associated class for each detected object, where the class is selected among predefined available classes. Therefore, this step comprises outputting a bounding box and one associated class for each object detected from the object detection model.

According to one embodiment, the object detection model is a Faster-RCNN, CenterNet, SOLO or a YOLO.

In a Faster R-CNN the image is provided as an input to a convolutional network which provides a convolutional feature map. A Faster R-CNN, is composed of two modules. The first module is a deep fully convolutional network that proposes regions, and the second module is the Faster R-CNN detector that uses the proposed regions. The entire system is a single, unified network for object detection. A neural network with 'attention' mechanisms, the RPN module for generating region proposals. The main different here with Faster R-CNN is that the later uses selective search to generate region proposals. The time cost of generating region proposals is much smaller in RPN than selective search, when RPN shares the most computation with the object detection network. Briefly, RPN ranks region boxes (called anchors) and proposes the ones most likely containing objects.

The Faster R-CNN unlike the two other object detection models (CenterNet, YOLO) is a two stages object detector meaning that bounding boxes are first proposed and then refined. In the one stage detector, the bounding boxes are not refined. Therefore, the performances of this model is usually better than single stage object detector.

A CenterNet detects each object as a triplet, rather than a pair, of keypoints, which improves both precision and recall. The CenterNet explores the central part of a proposal, i.e., the region that is close to the geometric center, with one extra keypoint. The architecture of CenterNet comprises a convolutional backbone network which applies cascade corner pooling and center pooling to output two corner heatmaps and a center keypoint heatmap, respectively. Similar to CornerNet, a pair of detected corners and the similar embeddings are used to detect a potential bounding box. Then the detected center keypoints are used to determine the final bounding boxes. The advantage of the CenterNet over the others model is that it is usually easier to implement, faster to train and during inference time.

YOLO uses fewer anchor boxes (divide the input image into an S×S grid) to do regression and classification. More in details YOLO is a network "inspired by" GoogleNet. It has twenty-four convolutional layers working as feature extractors and two fully connected layers for doing the predictions. The architecture of the feature extractors is called Darknet. To summarize, the input image is fed to the features extractor (Darknet) that outputs a features maps of shape S×S. Thus, the image is divided into a grid of S×S cells. Each cell of the feature maps is fed to a block of two consecutive fully connected layers that predicts B bounding boxes with their confidence scores and class probabilities over K classes. The confidence score is given in terms of an IOU (intersection over union) metric which basically measures how much a detected object overlaps with the ground truth object. The loss the algorithm minimizes takes into account the predictions of locations of the bounding boxes (x,y), their sizes (h, w), the confidence scores (obj score) for said predictions and the predicted classes (class probability).

On the other hand, SOLO uses "instance categories", which assigns categories to each pixel within an instance according to the instance's location and size, thus converting instance segmentation into a single-shot classification-solvable problem. Advantageously SOLO provides a much simpler and flexible instance segmentation framework with strong performance, achieving on par accuracy with Mask R-CNN and outperforming recent single-shot instance segmenters in accuracy.

The simpler architecture of YOLO and SOLO is particularly advantageous for the implementation in the medical field where only small amount of data are available for the training dataset and furthermore provides a faster inference which is important in the case where thousands of cellules are present on each single slide to be analyzed.

According to one embodiment, the method further comprises the step 150 of counting the bounding boxes associated to each class obtained as output of the object detection model so as to obtain the total number of objects for each class.

According to one embodiment, the method comprises the step 160 of inputting each uncountable connected component into a semantic segmentation model and obtaining as output a segmentation mask in which all pixels are classified into one class among the predefined available classes. In some cases, when there is a severe overlapping between objects, the objects are not individually identifiable by the human. Hence, in such case, an object detection model will fail to detect each individual object. Therefore, a segmentation model advantageously allows to compute an approximate count of the objects.

According to one embodiment, the semantic segmentation model is a U-Net. The architecture of a U-Net looks like a "U" which justifies its name. This architecture consists of three sections: (1) the contraction section, (2) the bottleneck section and (3) the expansion section.

The contraction section is made of several contraction blocks. Each block takes an input applies two 3×3 convolutional layers followed by a 2×2 max pooling. The number of kernels or feature maps after each block doubles so that the architecture can learn the complex structures effectively.

The bottleneck mediates between the contraction section and the expansion section. It uses two 3×3 convolutional layers followed by a 2×2 up sampling layer.

Like the contraction section, the expansion section consists of several expansion blocks. At the beginning of each expansion block, output features maps of the corresponding contraction block and the output of the previous expansion block are concatenated. Then, this concatenated block passes through two 3×3 convolutional layers and one 2×2 upsampling layer. For each expansion block, after the first 3×3 convolutional layer, the number of features maps are divided by two.

Finally, the resulting feature maps are passed through a last 1×1 convolutional layer where the number of resulting feature maps is equal to the number of classes.

According to one embodiment, the method comprises the step 170 of, for each class of the semantic segmentation model, counting the number of objects as the ratio between a total pixel's area of the class, obtained as the number of pixels of the segmentation mask associate to said class, and an average area of the object of said class.

According to one embodiment, the predefined classes for the semantic segmentation model and the object detection model are the same.

According to one embodiment, the semantic segmentation model and the object detection model are trained using a dataset of labelled digitalized images.

According to one embodiment, the semantic segmentation model and the object detection model are trained using a stochastic gradient descent training method.

According to one embodiment, each class is associated to at least one of the objects in the following list:
leukocytes: basophils, neutrophils, macrophage, monocyte and eosinophil;
red blood cells;
bacteria;
urinary crystal;
cylinder;
healthy and atypical urothelial cells;
squamous cells;
reactive urothelial cells, and/or
yeast.

According to one embodiment, the method further comprises the step of displaying the total count of objects for each class alongside to the digitalized image of at least one portion of the whole slide. In this a user may advantageously visualize the result of object counts obtained with the method as well as the digitalized image.

According to one embodiment, the method further comprises the step of displaying at least one string of characters providing an information on the presence or absence of objects in a class in the digitalized image. The string of characters may be displayed alongside the digitalized image.

The present invention further relates to a system for classifying and counting objects recoverable from a urine sample processed onto a slide. In what follows, the modules are to be understood as functional entities rather than material, physically distinct, components. They can consequently be embodied either as grouped together in a same tangible and concrete component, or distributed into several such components. Also, each of those modules is possibly itself shared between at least two physical components. In addition, the modules are implemented in hardware, software, firmware, or any mixed form thereof as well. They are preferably embodied within at least one processor of the system.

The system of the present invention may comprise an acquisition module configured to receive at least one digitalized image of the whole slide which comprises multiple objects. The acquisition module may be connected to a brightfield optical system configured to acquire at least one image of the whole slide.

In one embodiment, the system comprises a calculation module configured to:
- detect connected components by segmentation of the image of the whole slide;
- classify the detected connected components into countable connected components and uncountable connected components using a classifier;
- for the countable connected components:
  - input each countable connected component into an object detection model configured to detect objects and to output for each object one bounding box and an associated class;
  - count the bounding boxes associated to each class obtaining the number of objects for each class;
- for the uncountable components:
  - input each uncountable connected component into a semantic segmentation model and obtain as output a segmentation mask in which all pixels are classified into one class among the predefined available classes;
  - for each class, count the number of objects as the ratio between a total pixel's area of the class, obtained as the number of pixels of the segmentation mask associate to said class, and an average area of the object of said class;
  - wherein the predefined classes for the semantic segmentation model and the object detection model are the same,
- summing up the number of objects for each class obtained from the semantic segmentation model and the object detection model.

According to one embodiment, the system comprises an output module configured to output a number of objects for each class.

The present invention further comprises of a computer program product for classifying and counting objects recoverable from a urine sample, the computer program product comprising instructions which, when the program is executed by a computer, cause the computer to carry out the steps of the method according to any one of the embodiments described hereabove.

The computer program product to perform the method as described above may be written as computer programs, code segments, instructions or any combination thereof, for individually or collectively instructing or configuring the processor or computer to operate as a machine or special-purpose computer to perform the operations performed by hardware components. In one example, the computer program product includes machine code that is directly executed by a processor or a computer, such as machine code produced by a compiler. In another example, the computer program product includes higher-level code that is executed by a processor or a computer using an interpreter. Programmers of ordinary skill in the art can readily write the instructions or software based on the block diagrams and the flow charts illustrated in the drawings and the corresponding descriptions in the specification, which disclose algorithms for performing the operations of the method as described above.

The present invention further comprises a computer-readable storage medium comprising instructions which, when the program is executed by a computer, cause the computer to carry out the steps of the method according to any one of the embodiments described hereabove.

According to one embodiment, the computer-readable storage medium is a non-transitory computer-readable storage medium.

Computer programs implementing the method of the present embodiments can commonly be distributed to users on a distribution computer-readable storage medium such as, but not limited to, an SD card, an external storage device, a microchip, a flash memory device, a portable hard drive and software websites. From the distribution medium, the computer programs can be copied to a hard disk or a similar intermediate storage medium. The computer programs can be run by loading the computer instructions either from their distribution medium or their intermediate storage medium into the execution memory of the computer, configuring the computer to act in accordance with the method of this invention. All these operations are well-known to those skilled in the art of computer systems.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

The invention claimed is:

1. A computer-implemented method for classifying and counting objects recoverable from a urine sample processed onto a slide, said method comprising:
   - receiving at least one digitalized image of the whole slide;
   - detecting connected components by segmentation of the image of the whole slide;
   - classifying the detected connected components into countable connected components and uncountable connected components using a classifier;
   - for the countable connected components:
   - inputting each countable connected component into an object detection model so as to detect objects and obtain an output comprising a bounding box and an associated class for each detected object;
   - counting the bounding boxes associated to each class obtaining a number of objects for each class;
   - for the uncountable components:
   - inputting each uncountable connected component into a semantic segmentation model and obtaining as output a segmentation mask in which all pixels are classified into one class among multiple predefined available classes;

for each class, counting the number of objects as a ratio between a total pixel's area of the class, obtained as a number of pixels of the segmentation mask associate to said class, and an average area of the object of said class;

summing up the number of objects for each class obtained from the semantic segmentation model and the object detection model;

outputting the number of objects for each class;

wherein said classes for the semantic segmentation model and the object detection model are the same.

2. The method according to claim 1, wherein the semantic segmentation model is a U-Net.

3. The method according to claim 1, wherein the object detection model is a Faster-RCNN, CenterNet, SOLO or a YOLO.

4. The method according to claim 1, wherein the received digitalized image results from a brightfield optical system.

5. The method according to claim 1, wherein the semantic segmentation model and the object detection model are trained using a dataset of labelled digitalized images.

6. The method according to claim 5, wherein the semantic segmentation model and the object detection model are trained using a stochastic gradient descent training method.

7. The method according to claim 1, wherein each class of the semantic segmentation model and the object detection model is associated to at least one of the objects in the following list:
  leukocytes: basophils, neutrophils, macrophage, monocyte and eosinophil;
  red blood cells;
  bacteria;
  urinary crystal;
  cylinder;
  healthy and atypical urothelial cells;
  squamous cells;
  reactive urothelial cells, and/or
  yeast.

8. The method according to claim 1, further comprising displaying the total count of objects for each class alongside to the digitalized image of at least one portion of the whole slide.

9. The method according to claim 8, further comprising displaying at least one string of characters providing an information on a presence or an absence of objects in a class with the digitalized image.

10. The method according to claim 1, wherein the sample is colored by a Pap stain.

11. A system for classifying and counting objects recoverable from a urine sample processed onto a slide, said system comprising:
  at least one input adapted to receive at least one digitalized image of the whole slide comprising multiple objects;
  at least one calculation module configured to:
  detect connected components by segmentation of the image of the whole slide;
  classify the detected connected components into countable connected components and uncountable connected components using a classifier;
  for the countable connected components:
  (i) input each countable connected component into an object detection model configured to detect objects and to output for each object one bounding box and an associated class;
  (ii) count the bounding boxes associated to each class obtaining the number of objects for each class;
  for the uncountable components:
  (i) input each uncountable connected component into a semantic segmentation model and obtain as output a segmentation mask in which all pixels are classified into one class among the predefined available classes;
  (ii) for each class, count the number of objects as a ratio between a total pixel's area of the class, obtained as a number of pixels of the segmentation mask associate to said class, and an average area of the object of said class;
  summing up the number of objects for each class obtained from the semantic segmentation model and the object detection model;
  wherein said classes for the semantic segmentation model and the object detection model are the same; and
  at least one output adapted to provide a number of objects for each class.

12. The system according to claim 11, wherein the object detection model is a Faster-RCNN, CenterNet, SOLO or a YOLO.

13. The system according to claim 11, wherein the semantic segmentation model and the object detection model are trained using a dataset of labelled digitalized images.

14. The system according to claim 11, wherein the semantic segmentation model and the object detection model are trained using a stochastic gradient descent training method.

15. A computer program stored on a non-transitory computer-readable medium for classifying and counting objects recoverable from a urine sample, the computer program comprising instructions which, when the program is executed by a computer, cause the computer to carry out the method comprising:
  receiving at least one digitalized image of the whole slide;
  detecting connected components by segmentation of the image of the whole slide;
  classifying the detected connected components into countable connected components and uncountable connected components using a classifier;
  for the countable connected components:
  inputting each countable connected component into an object detection model so as to detect objects and obtain an output comprising a bounding box and an associated class for each detected object;
  counting the bounding boxes associated to each class obtaining a number of objects for each class;
  for the uncountable components:
  inputting each uncountable connected component into a semantic segmentation model and obtaining as output a segmentation mask in which all pixels are classified into one class among multiple predefined available classes;
  for each class, counting the number of objects as a ratio between a total pixel's area of the class, obtained as a number of pixels of the segmentation mask associate to said class, and an average area of the object of said class;
  summing up the number of objects for each class obtained from the semantic segmentation model and the object detection model;
  outputting the number of objects for each class;
  wherein said classes for the semantic segmentation model and the object detection model are the same.

16. The method according to claim 15, wherein the semantic segmentation model and the object detection model are trained using a dataset of labelled digitalized images.

17. A non-transitory computer-readable storage medium comprising instructions which, when the program is executed by a computer, cause the computer to carry out the method comprising
receiving at least one digitalized image of the whole slide;
detecting connected components by segmentation of the image of the whole slide;
classifying the detected connected components into countable connected components and uncountable connected components using a classifier;
for the countable connected components:
inputting each countable connected component into an object detection model so as to detect objects and obtain an output comprising a bounding box and an associated class for each detected object;
counting the bounding boxes associated to each class obtaining a number of objects for each class;
for the uncountable components:
inputting each uncountable connected component into a semantic segmentation model and obtaining as output a segmentation mask in which all pixels are classified into one class among multiple predefined available classes;
for each class, counting the number of objects as a ratio between a total pixel's area of the class, obtained as a number of pixels of the segmentation mask associate to said class, and an average area of the object of said class;
summing up the number of objects for each class obtained from the semantic segmentation model and the object detection model;
outputting the number of objects for each class;
wherein said classes for the semantic segmentation model and the object detection model are the same.

18. The non-transitory computer-readable storage medium according to claim 17, wherein the semantic segmentation model and the object detection model are trained using a dataset of labelled digitalized images.

* * * * *